(12) United States Patent
Hamilton, II et al.

(10) Patent No.: US 11,500,443 B2
(45) Date of Patent: *Nov. 15, 2022

(54) INTRODUCING SELECTIVE ENERGY EFFICIENCY IN A VIRTUAL ENVIRONMENT

(71) Applicant: KYNDRYL, INC., New York, NY (US)

(72) Inventors: Rick A. Hamilton, II, Charlottesville, VA (US); John P. Karidis, Ossining, NY (US); Clifford A. Pickover, Yorktown Heights, NY (US); Robert Wisniewski, Ossining, NY (US)

(73) Assignee: KYNDRYL, INC., New York, NY (US)

( * ) Notice: Subject to any disclaimer, the term of this patent is extended or adjusted under 35 U.S.C. 154(b) by 145 days.

This patent is subject to a terminal disclaimer.

(21) Appl. No.: 16/597,908

(22) Filed: Oct. 10, 2019

(65) Prior Publication Data

US 2020/0042072 A1 Feb. 6, 2020

Related U.S. Application Data

(63) Continuation of application No. 15/010,517, filed on Jan. 29, 2016, now Pat. No. 10,466,762, which is a
(Continued)

(51) Int. Cl.
*G06F 1/32* (2019.01)
*G06F 1/3234* (2019.01)
(Continued)

(52) U.S. Cl.
CPC .......... *G06F 1/3234* (2013.01); *G06F 1/3203* (2013.01); *G06F 1/329* (2013.01); *G06F 1/3265* (2013.01)

(58) Field of Classification Search
CPC ........ G06F 1/3202; G06F 1/3231; G06F 1/26; G06F 1/206; G06F 1/3228; G06F 1/08;
(Continued)

(56) References Cited

U.S. PATENT DOCUMENTS 5,736,990 A 4/1998 Barrus et al.
5,764,232 A 6/1998 Oouchi
(Continued)

FOREIGN PATENT DOCUMENTS

JP 2003061263 2/2003

OTHER PUBLICATIONS

"U.S. Appl. No. 11/931,826 Office Action", dated Jul. 11, 2011, 23 pages.
(Continued)

*Primary Examiner* — Zahid Choudhury
(74) *Attorney, Agent, or Firm* — Erik Swanson; Hunter E. Webb; Keohane & D'Alessandro, PLLC (57) ABSTRACT

A system and method for energy conservation in a virtual universe, the method comprising: determining, at a server, available energy conservation options associated with an avatar of the virtual universe; determining, at the server, selected energy conservation options of the available energy conservation options; and applying, at the server, the selected energy conservation options to portions of the virtual universe associated with the avatar.

20 Claims, 8 Drawing Sheets

Related U.S. Application Data continuation of application No. 12/194,633, filed on Aug. 20, 2008, now Pat. No. 9,268,385.

(51) Int. Cl.
*G06F 1/3203* (2019.01)
*G06F 1/329* (2019.01)

(58) Field of Classification Search
CPC ...... G06F 1/3289; G06F 1/266; G06F 1/3234; G06F 1/3203; G06F 1/3265; G06F 1/329; H04L 12/12; H04L 12/10
See application file for complete search history.

(56) References Cited

U.S. PATENT DOCUMENTS

| | | | |
|---|---|---|---|
| 5,879,236 A | 3/1999 | Lambright | |
| 6,072,498 A | 6/2000 | Brittain et al. | |
| 6,256,043 B1 | 7/2001 | Aho et al. | |
| 6,327,541 B1 | 12/2001 | Pitchford et al. | |
| 6,598,029 B1 | 7/2003 | Johnson et al. | |
| 6,631,309 B2 | 10/2003 | Boies et al. | |
| 6,672,961 B1 | 1/2004 | Uzun | |
| 6,767,287 B1 | 7/2004 | McQuaid et al. | |
| 6,772,195 B1* | 8/2004 | Hatlelid | G06F 3/04815 345/419 |
| 6,785,592 B1 | 8/2004 | Smith et al. | |
| 6,912,565 B1 | 6/2005 | Powers et al. | |
| 6,937,946 B1 | 8/2005 | Culp et al. | |
| 7,096,360 B1 | 8/2006 | Fries | |
| 7,135,956 B2 | 11/2006 | Bartone et al. | |
| 7,171,287 B2 | 1/2007 | Weiss | |
| 7,358,973 B2 | 4/2008 | Herbrich et al. | |
| 7,805,680 B2 | 9/2010 | Meyers et al. | |
| 3,013,861 A1 | 9/2011 | Hamilton et al. | |
| 8,086,544 B2 | 12/2011 | Boss et al. | |
| 8,127,297 B2 | 2/2012 | Hamilton, II et al. | |
| 8,199,145 B2 | 6/2012 | Hamilton, II et al. | |
| 8,214,843 B2 | 7/2012 | Boss et al. | |
| 8,234,016 B2 | 7/2012 | Boss et al. | |
| 8,327,376 B2 | 12/2012 | Hamilton, II et al. | |
| 8,667,498 B2 | 3/2014 | Hamilton, II et al. | |
| 9,268,385 B2 | 2/2016 | Hamilton, II et al. | |
| 2002/0062177 A1 | 5/2002 | Hannaford et al. | |
| 2003/0057884 A1 | 3/2003 | Dowling et al. | |
| 2003/0210271 A1 | 11/2003 | King | |
| 2004/0098142 A1 | 5/2004 | Warren et al. | |
| 2004/0215536 A1 | 10/2004 | Deliwala et al. | |
| 2004/0254899 A1 | 12/2004 | Abe et al. | |
| 2005/0024362 A1 | 2/2005 | Klein | |
| 2005/0033601 A1 | 2/2005 | Kirby et al. | |
| 2005/0080894 A1 | 4/2005 | Apostolopoulos et al. | |
| 2005/0165512 A1 | 7/2005 | Peljto | |
| 2006/0119598 A1 | 6/2006 | Littlefield | |
| 2006/0135261 A1 | 6/2006 | Kinne et al. | |
| 2007/0005466 A1 | 1/2007 | Rosenblatt et al. | |
| 2007/0061201 A1 | 3/2007 | Ellis et al. | |
| 2007/0097206 A1 | 5/2007 | Houvener et al. | |
| 2007/0219645 A1 | 9/2007 | Thomas et al. | |
| 2007/0244604 A1 | 10/2007 | McNally | |
| 2007/0288973 A1* | 12/2007 | Glatron | H04N 5/23206 725/105 |
| 2008/0074415 A1 | 3/2008 | Woo et al. | |
| 2008/0177423 A1 | 7/2008 | Brickfield et al. | |
| 2008/0207322 A1 | 8/2008 | Mizrahi | |
| 2008/0212884 A1* | 9/2008 | Oneda | H04N 19/132 382/232 |
| 2008/0255899 A1 | 10/2008 | McConnell et al. | |
| 2008/0306951 A1 | 12/2008 | Rodefer | |
| 2008/0313011 A1 | 12/2008 | Rose et al. | |
| 2009/0063228 A1 | 3/2009 | Forbes | |
| 2009/0109229 A1 | 4/2009 | Hamilton, II et al. | |
| 2009/0113338 A1 | 4/2009 | Hamilton, II et al. | |
| 2009/0113421 A1 | 4/2009 | Hamilton, II et al. | |
| 2009/0118019 A1 | 5/2009 | Perlman et al. | |
| 2009/0187782 A1 | 7/2009 | Greene et al. | |
| 2009/0265568 A1 | 10/2009 | Jackson | |
| 2009/0278841 A1 | 11/2009 | Hamilton, II et al. | |
| 2009/0281743 A1 | 11/2009 | Hamilton, II et al. | |
| 2009/0281885 A1 | 11/2009 | Castelli et al. | |
| 2009/0281886 A1 | 11/2009 | Castelli et al. | |
| 2010/0050004 A1 | 2/2010 | Hamilton, II et al. | |
| 2010/0052872 A1 | 3/2010 | Boss et al. | |
| 2010/0057529 A1 | 3/2010 | Boss | |
| 2010/0057625 A1 | 3/2010 | Boss et al. | |
| 2010/0057641 A1 | 3/2010 | Boss et al. | |
| 2010/0058350 A1 | 3/2010 | Boss et al. | |
| 2010/0070807 A1 | 3/2010 | Hamilton, II et al. | |
| 2010/0083107 A1 | 4/2010 | Allen et al. | |
| 2010/0107084 A1 | 4/2010 | Hamilton, II et al. | |
| 2010/0220097 A1 | 9/2010 | Hamilton, II et al. | |
| 2010/0332997 A1 | 12/2010 | Hamilton, II et al. | |
| 2011/0055726 A1 | 3/2011 | Hamilton, II et al. | |
| 2011/0113018 A1 | 5/2011 | Hamilton, II et al. | |
| 2011/0131226 A1 | 6/2011 | Chandra et al. | |
| 2011/0225276 A1 | 9/2011 | Hamilton, II et al. | |
| 2011/0254853 A1 | 10/2011 | Hamilton, II et al. | |
| 2012/0002667 A1 | 1/2012 | Zhao et al. | |
| 2012/0113127 A1 | 5/2012 | Hamilton, II et al. | |
| 2012/0117233 A1 | 5/2012 | Hamilton, II et al. | |
| 2012/0188278 A1 | 7/2012 | Hamilton, II et al. | |
| 2016/0162009 A1 | 6/2016 | Hamilton, II et al. | |

OTHER PUBLICATIONS

"U.S. Appl. No. 11/932,114 Office Action", dated Oct. 29, 2010, 18 pages.

"U.S. Appl. No. 11/932,319 Office Action", dated May 26, 2011, 22 pages.

"U.S. Appl. No. 12/115,958 Office Action", dated Oct. 28, 2010, 13 pages.

"U.S. Appl. No. 12/115,963 Office Action", dated Jul. 22, 2011, 26 pages.

"U.S. Appl. No. 12/117,348 Office Action", dated May 12, 2010, 12 pages.

"U.S. Appl. No. 12/117,360", filed Sep. 2, 2011, 22 pages.

"U.S. Appl. No. 12/117,360 Office Action", dated Mar. 25, 2011, 23 pages.

"U.S. Appl. No. 12/194,633 Final Office Action", dated Mar. 12, 2012, 16 pages.

"U.S. Appl. No. 12/194,633 Office Action", dated Aug. 2, 2011, 22 pages.

"U.S. Appl. No. 13/169,881 Office Action", dated Oct. 7, 2011, 12 pages.

"U.S. Appl. No. 13/169,881 Final Office Action", dated Mar. 15, 2012, 16 pages.

"U.S. Appl. No. 13/169,881 Office Action", dated Nov. 16, 2012, 24 pages.

"U.S. Appl. No. 13/352,266 Office Action", dated Mar. 16, 2012, 28 pages.

"U.S. Appl. No. 13/352,270 Office Action", dated Apr. 5, 2012, 28 pages.

"U.S. Appl. No. 13/616,210 Office Action", dated May 23, 2013, 28 pages.

Trefftz, et al., "Local and Global Impact of Message Caching in Shared Virtual Environments", Proceedings of the IASTED International Conference on Computer Graphics and Imaging 2000 (CGIM 2000), Nov. 20, 2000, 8-13.

Appendix P—List of IBM Patents or Patent Applications Treated as Related, Filed herewith, 2 Pages.

"The Green500 List News and Submitted Items", The Green500, downloaded from the internet on May 18, 2021, 4 pages, <http://www.green500.org/>.

"Universally unique identifier", Wikipedia, last edited on May 11, 2021, 8 pages, <https://en.wikipedia.org/wiki/Universally_unique_identifier>.

Sternstein, Aliya, "Government IT goes green", FWC.com, Published on Sep. 18, 2006, 2 pages, <https://web.archive.org/web/

(56) References Cited

OTHER PUBLICATIONS

20081227002828/http://www.fcw.com/print/12_34/news/96077-1.html>.

* cited by examiner

INTRODUCING SELECTIVE ENERGY EFFICIENCY IN A VIRTUAL ENVIRONMENT

TECHNICAL FIELD

Embodiments of the inventive subject matter generally relate to the field of virtual universes, and more particularly, to methods for introducing selective energy efficiency in a virtual environment.

BACKGROUND

Virtual universe systems allow people to socialize and interact in a virtual universe. A virtual universe ("VU") is a computer-based simulation environment intended for its residents to traverse, inhabit, and interact through the use of avatars and other constructs. Many VUs are represented using 3-D graphics and landscapes, and are populated by many thousands of users, known as "residents". Other terms for VUs include metaverses and 3D Internet.

SUMMARY

In some embodiments, a method for energy conservation in a virtual universe comprises: determining, at a server, available energy conservation options associated with an avatar of the virtual universe; determining, at the server, selected energy conservation options of the available energy conservation options; and applying, at the server, the selected energy conservation options to portions of the virtual universe associated with the avatar.

In some embodiments, a server comprises a memory; and a processor coupled to the memory, the processor configured to: determine available energy conservation options associated with an avatar of a virtual universe; determine selected energy conservation options of the available energy conservation options; and apply the selected energy conservation options to portions of the virtual universe associated with the avatar.

In some embodiments, a computer program product for energy conservation in a virtual universe comprises a computer readable storage medium having program instructions embodied therewith, the program instructions executable by a processor to cause the processor to: determine available energy conservation options associated with an avatar of the virtual universe; determine selected energy conservation options of the available energy conservation options; and apply the selected energy conservation options to portions of the virtual universe associated with the avatar.

BRIEF DESCRIPTION OF THE DRAWINGS

The present embodiments may be better understood, and numerous objects, features, and advantages made apparent to those skilled in the art by referencing the accompanying drawings.

DETAILED DESCRIPTION

The description that follows includes exemplary systems, methods, techniques, instruction sequences, and computer program products that embody techniques of the present inventive subject matter. However, it is understood that the described embodiments may be practiced without these specific details. In some instances, well-known instruction instances, protocols, structures, and techniques have not been shown in detail in order not to obfuscate the description.

Figure 1:
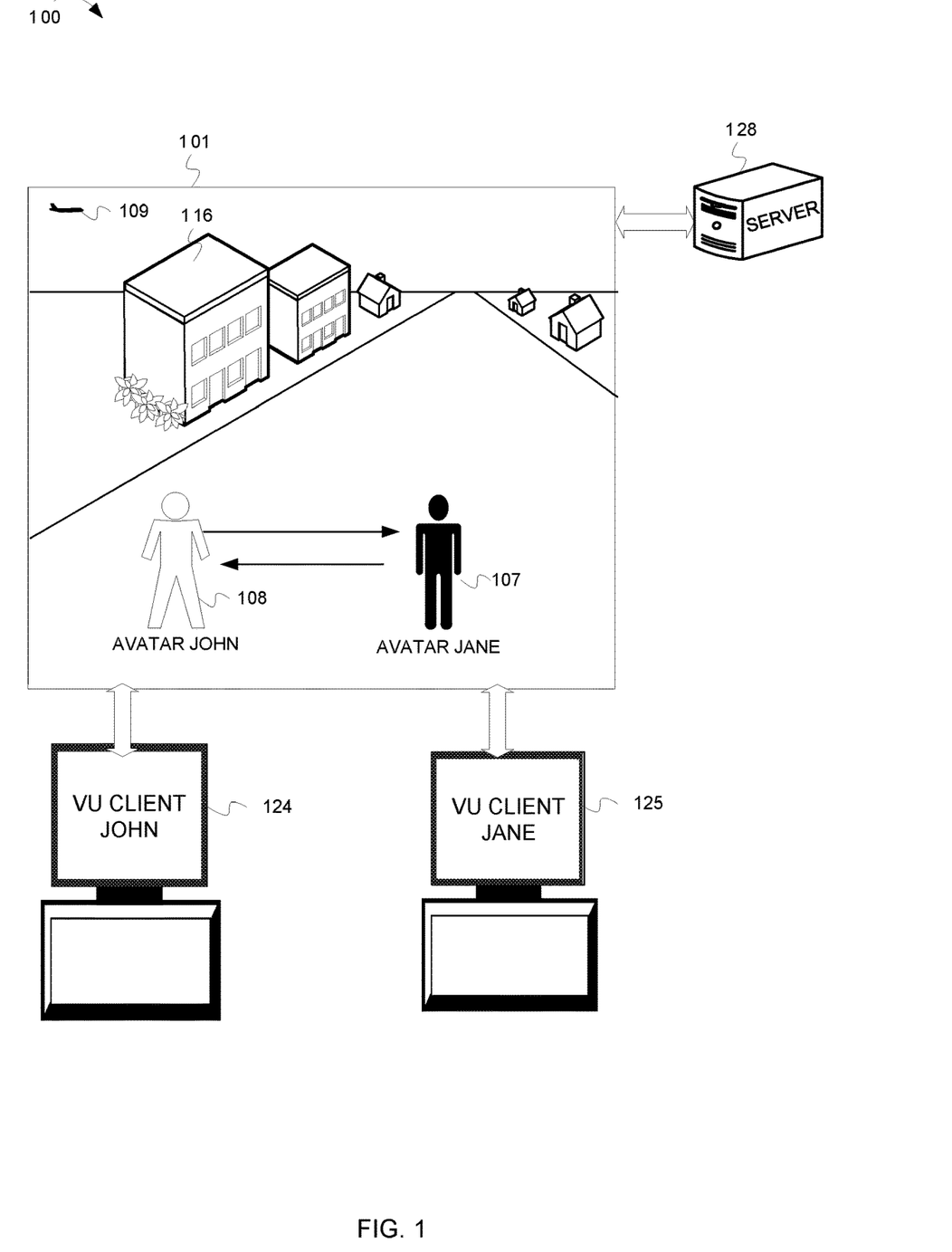
FIG. 1 is a conceptual diagram illustrating an example virtual universe environment.

Virtual universes (VUs) are becoming increasingly popular for social and business use. FIG. 1 is a conceptual diagram illustrating an example virtual universe (VU) environment 100. The virtual universe environment 100 includes a server 128 and clients 124 & 125. The server 128 includes logic (e.g., software) for presenting and managing a virtual universe 101. The clients 124 & 125 include logic that enables users to view the virtual universe 101, control avatars, and otherwise interact with the virtual universe 101. The virtual universe 101 includes various objects, such as avatars 107 & 108, buildings 116, modes of transportation 109, etc. In the virtual universe 101, users can use their avatars to interact with other avatars and with their surroundings, buy items from stores, visit buildings, teleport to other parts of the virtual universe, move objects, participate in activities, etc.

Running, managing, and rendering a virtual universe 101 can consume a lot of energy and resources (e.g., CPU power, network bandwidth, memory, etc.). Presenting a virtual universe involves many complex calculations, three-dimensional graphics, displaying minute details, realistic landscape, and other such features. The server 108 typically generates the graphics, performs computations, and relays this information (e.g., geometric coordinates, textures, and positions of objects and avatars) to the client (e.g., 124), so that the client can render the VU. The client 124 may use the geometric coordinates and positions, communicated by the server, to present the objects, avatars, landscape, lighting, shading, etc. Because the server may perform these operations for many clients (e.g., in real-time), the server may consume a lot of power, network bandwidth, and system resources (e.g., CPU, memory). Although there are virtual universe systems that enable green computing (i.e., using computing resources efficiently and implementing energy saving mechanisms), very often these energy saving mechanisms are applied automatically by the VU simulation software without any consideration for the users' preferences. For example, if users are watching a concert when the load on the server is high, the server may display the three-dimension concert in two dimensions and drastically reduce the quality of the video, which may not be acceptable to users. Hence, users may want a system that allows them to participate in allowing a virtual universe server to operate more efficiently.

Moreover, users are the best judges of which energy conservation schemes work best for them. Referring to the previous example of users watching a concert, the user may choose to view the concert in high resolution with three-dimensional graphics, but can still help conserve resources by directing the server to reduce the field of view. Also, because different users experience and use the virtual universe environment differently, users may want a customizable system, which allows them to dynamically specify when, where, and how power saving techniques may be applied. For example, users may be willing to reduce resolution when they walk into a bank, but not when they are watching a game or are on a site seeing tour. As another example, some users may be willing to let the simulation software determine and apply the most appropriate power saving techniques, while others may want to enable and disable these techniques on a case by case basis. Additionally, users may be more likely to apply these energy conservation schemes if there are incentives for doing so. Users may want a system, which provides rewards (e.g., VU money, virtual objects, etc.) commensurate with the amount of energy saved. Some embodiments of the inventive subject matter enable users of a virtual universe to select and apply energy conservation schemes. The following discussion describes this and other important features in greater detail.

Architecture and Operating Environment

This section describes an example of the architecture for a virtual universe network with firewalls and presents aspects of some embodiments.

Virtual Universe Network Architecture

Figure 2:
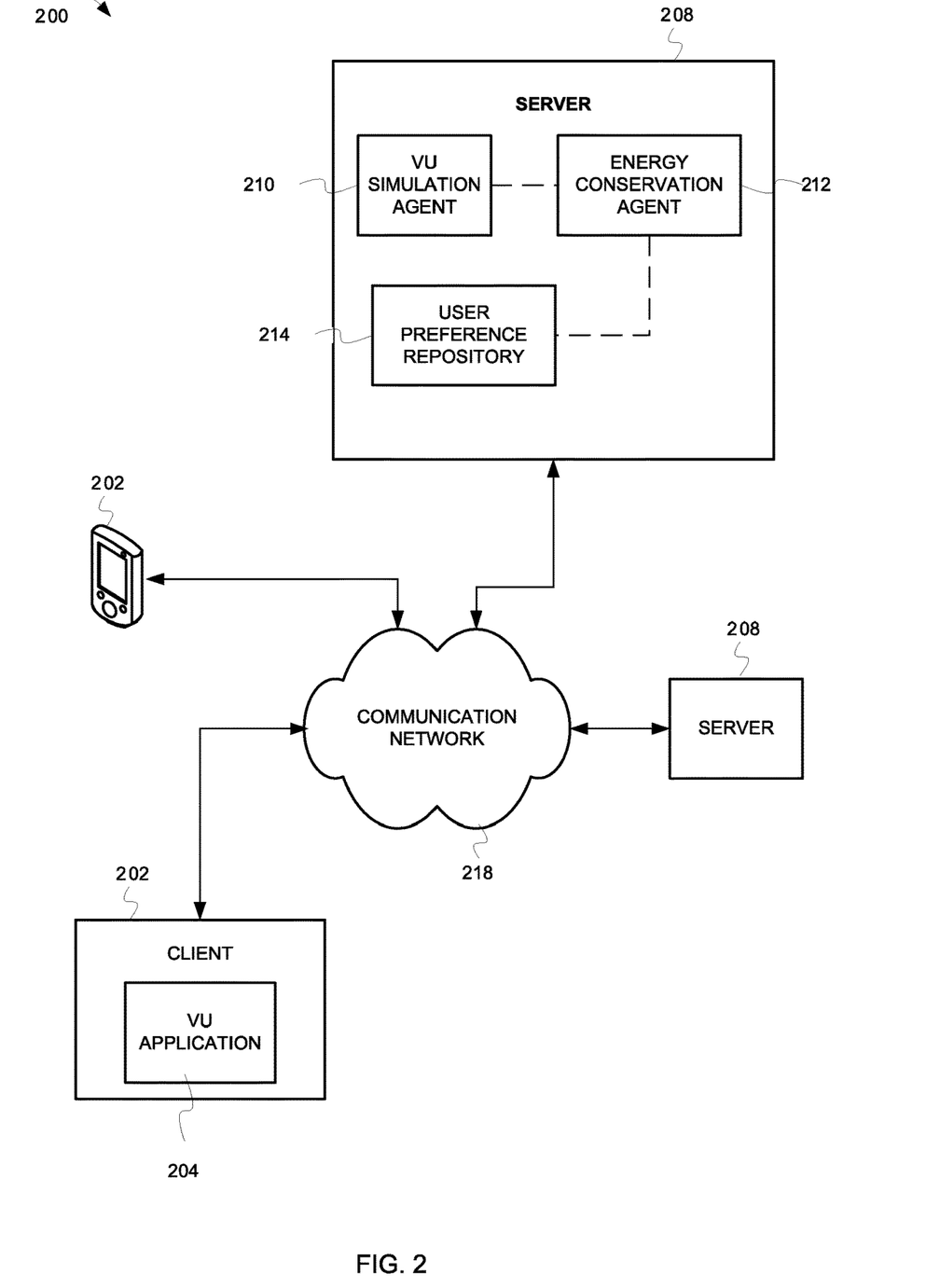
FIG. 2 is a block diagram illustrating a virtual universe network configured to enable users to dynamically select and apply energy conservation techniques to a virtual universe environment, according to some embodiments of the invention.

FIG. 2 is a block diagram illustrating a virtual universe network configured to enable users to dynamically select and apply energy conservation techniques to a virtual universe environment, according to some embodiments of the invention. As shown in FIG. 2, the network includes servers 208 and clients 202. The server includes a virtual universe (VU) simulation agent 210, an energy conservation agent 212, and a user preference repository 214. The VU simulation agent 210 includes logic (e.g., software) to present a virtual universe environment including VU objects, avatars, graphics, landscape, etc. on the client 202. The VU simulation agent 210 can also calculate avatar motion and handle the avatar's interaction with other avatars and/or VU objects. The user preference repository 214 can include a list of registered VU users and user details such as avatar name, user status, permissions, energy conservation preferences, etc. The energy conservation agent 212 can include energy conservation schemes associated with regions, buildings, and other VU geographic areas. The energy conservation agent 212 can enable the VU server 208 and/or the clients 202 to conserve energy, resources, and network bandwidth and reduce computation according to the users' preferences.

In some embodiments, the VU simulation agent 210 triggers the energy conservation agent 212 whenever a user logs into the virtual universe or enters a new VU geographic area. The energy conservation agent 212 in turn, can interface with the user preference repository 214 to determine whether the user has a preferred energy conservation scheme. In some instances, the energy conservation agent 212 can also display, via the client's VU application 204, a list of available energy conservation schemes. The energy conservation agent 212 can determine the user-specified scheme and direct the VU simulation agent 210 to accordingly modify the VU environment (e.g., reduce resolution in a bank, display objects other than the bank in two-dimensions, etc.) and communicate the modified environment to the client. In some instances, the energy conservation agent 212 can also determine the client's specifications (e.g., graphics card specifications, resource usage, etc.) and off-load some of the computation to the client 204 in an effort to reduce the server's resource consumption. In other instances, the energy conservation agent 212 can also determine locations where energy costs are cheap and offload computation to servers at those sites, in an effort to reduce computing costs.

The servers 208 and the clients 202 are connected to the communication network 218. The communication network 218 can include any technology suitable for passing communication between the clients and servers (e.g., Ethernet, 802.11n, SONET, etc.). Moreover, the communication network 218 can be part of other networks, such as cellular telephone networks, public-switched telephone networks (PSTN), cable television networks, etc. Additionally, the servers 208 and clients 202 can be any suitable computing devices capable of executing software in accordance with the embodiments described herein.

Example Energy Conservation Agent Operations

This section describes operations associated with some embodiments of the invention. The flow diagrams will be described with reference to the architectural block diagram presented above. However, in some embodiments, the operations can be performed by logic not described in the block diagrams; furthermore, some embodiments can perform more or less than the operations shown in any flow diagram. In certain embodiments, the operations can be performed by executing instructions residing on machine-readable media (e.g., software), while in other embodiments, the operations can be performed by hardware and/or other logic (e.g., firmware). In some embodiments, the operations can be performed in series, while in other embodiments, one or more of the operations can be performed in parallel.

Figure 3:
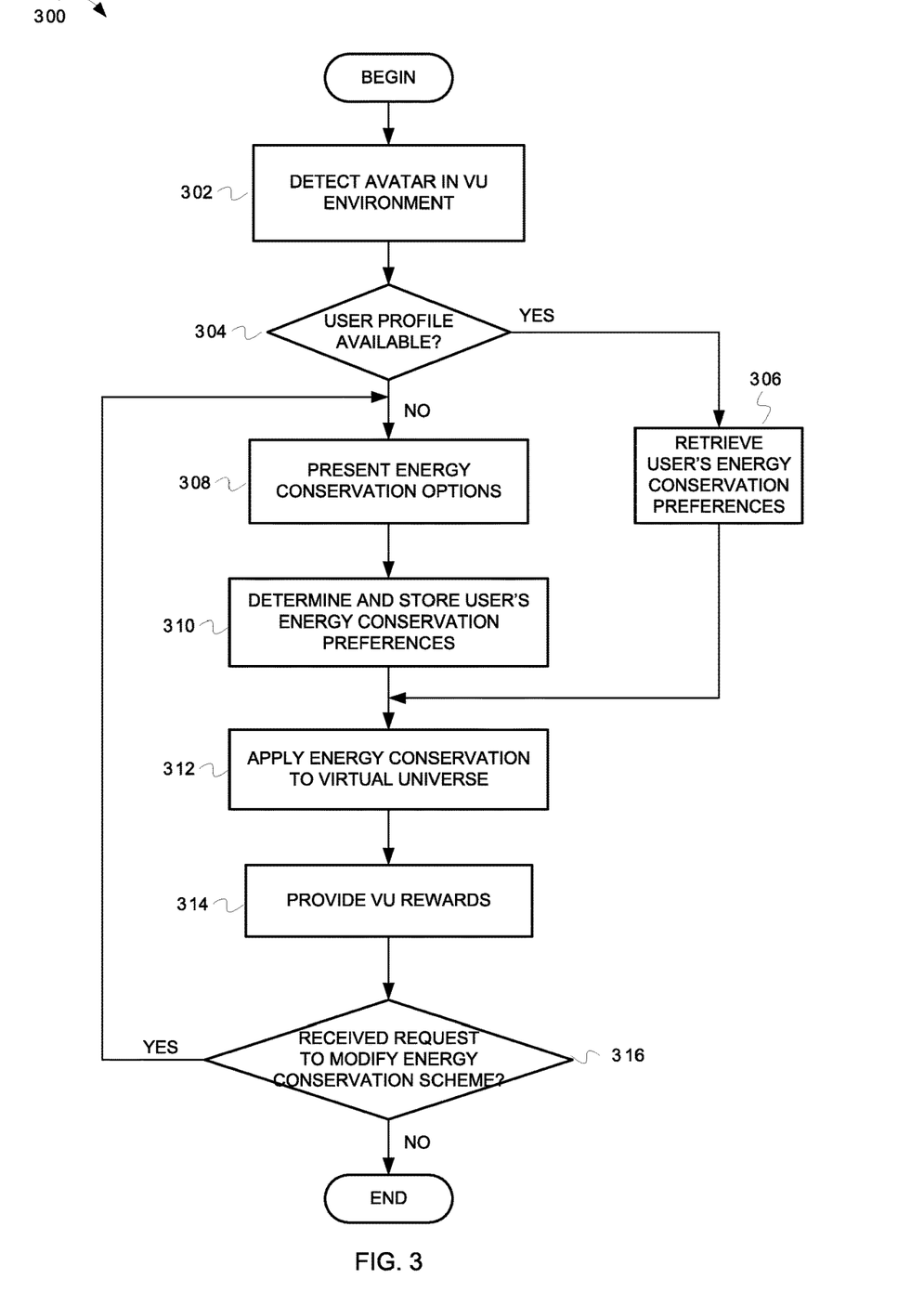
FIG. 3 is a flow diagram illustrating operations for applying energy conservation mechanisms to a virtual universe and rewarding users who enable these mechanisms, according to some embodiments of the invention.

FIG. 3 is a flow diagram illustrating operations for applying energy conservation mechanisms to a virtual universe and rewarding users who enable these mechanisms, according to some embodiments of the invention. The following discussion will describe the flow 300 with reference to the system of FIG. 2. The flow diagram 300 begins at block 302.

At block 302, an energy conservation agent 212 detects an avatar in a virtual universe environment. The energy conservation agent 212 can determine the position of the avatar by monitoring user actions (e.g., users logging into the system, avatars moving around the virtual world, avatars entering different VU geographic regions, etc.), receiving communications from a VU simulation agent 210, or by other means. The flow continues at block 304.

At block 304, the energy conservation agent 212 determines whether a profile exists for the user detected at block 302. In some embodiments, when the user accesses the virtual universe (e.g., via a login page on a website), the user provides a username or other unique identifier. In turn, the energy conservation agent 212 can use the username to identify the user's profile in the user profile repository 214. The energy conservation agent 212 can use the user's profile and interface with the VU simulation agent 210 to apply an initial energy conservation scheme to the VU based on the user's preferences. The VU simulation agent 210 can communicate the modified VU environment to the client's VU application 205. However, if the user does not have a profile or has not specified energy conservation preferences, the energy conservation agent 212 can dynamically determine the user's preferred energy conservation mechanism, direct the VU simulation agent 210 to apply the mechanisms, and reward the user for helping conserve VU resources. If the user has a profile on the server, the flow continues at block 308. Otherwise, the flow continues at block 306.

Figure 4:
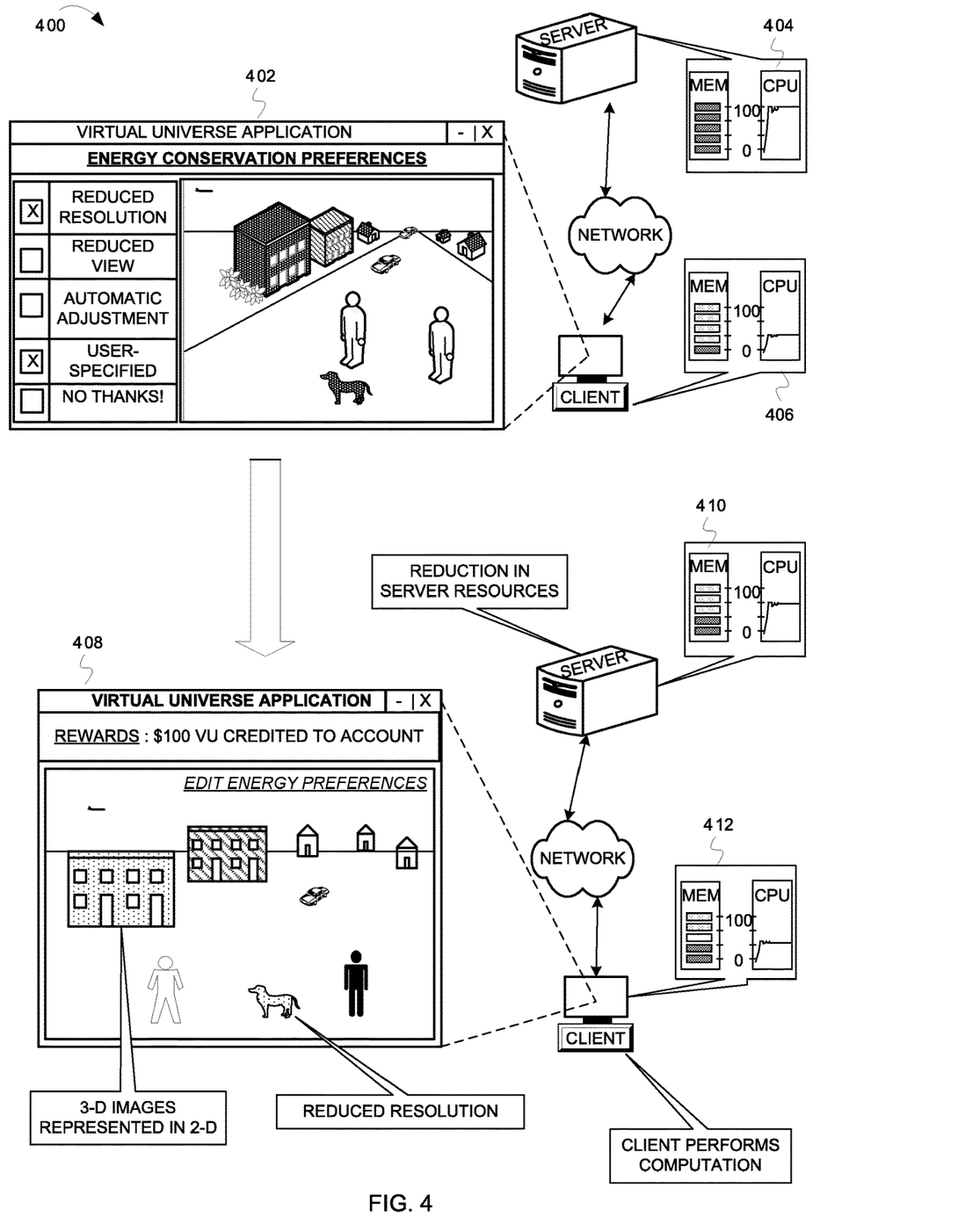
FIG. 4 is a conceptual diagram illustrating the effect of applying energy conservation techniques to a virtual universe, according to some embodiments of the invention.

At block 308, the energy conservation agent 212 presents, on the user's VU application 205, a list of energy conservation options. The energy conservation agent 212 allows the user to choose one or more techniques to conserve energy and enable green computing (i.e., using computing resources efficiently). FIG. 4 is a conceptual diagram illustrating the effect of applying energy conservation techniques to a virtual universe, according to some embodiments of the invention. Screenshot 402 in FIG. 4 shows an example virtual universe with virtual objects, avatars, landscape, etc. When a user logs into a virtual universe and/or enters a new VU region, the energy conservation agent 212 can display a list of available energy conservation mechanisms (e.g., reduced resolution, reduced view, automatic adjustment by the system, etc.). In some instances, the user may also have the option of selecting a different power saving technique for different occasions (i.e., user defined energy conservation schemes). For example, when a user's avatar walks into a bank, the user may select the "low resolution" option, while at a concert, the user may choose not to apply any power saving scheme. Users can also opt to use a low power version of the VU (including low resolution images with low refresh rates, snapshot image of the landscape using minimal three-dimensional geometry and lighting), etc. Additionally, if the client is lightly loaded, the energy conservation agent 212 can also offload some of the computation to the client and/or other servers. This can reduce the load on the server, conserve energy, and reduce energy costs. The energy conservation agent 212 can present the energy conservation options upon user request and/or every time users enter a new VU geographic area. The energy conservation agent 212 can present these options in a pop up window, in a sidebar on the screen, or by other means. Referring back to FIG. 3, after the energy conservation agent 212 presents a list of available power saving techniques, the flow continues at block 310.

At block 310, the energy conservation agent 212 determines and stores the user's energy conservation preferences. In some instances, the user can select an energy conservation scheme though a configuration screen, menu, using graphical control elements (e.g., lever, switch, etc.) on the VU landscape, using written or spoken commands, or by other means. A user can select energy conservation schemes when the avatar is created, when the user logs into the system, when the user enters a different VU geographic area, or anytime on the user's request. The energy conservation agent 212 can determine the user's specified power saving technique by monitoring user actions, receiving communications from the VU simulation agent 210, or by other means. In some instances, after the user selects an energy conservation scheme, the energy conservation agent 212 can also give the user an option to store these preferences in the user profile repository 214 for use at a later date. Alternately, the user may choose not to save the power saving preferences. After the energy conservation agent 212 determines the user-specified energy conservation scheme, the flow continues at block 312.

At block 312, the energy conservation agent 212 applies the specified energy conservation technique to the VU environment. As described earlier, the energy conservation agent 212 can reduce the resolution of objects, represent three-dimensional objects in their two-dimensional form, reduce special effects (e.g., sparkling effects) associated with objects, etc. In some instances, the energy conservation agent 212 can also determine the avatar's position and reduce the field of view, obfuscate distant objects, and/or collapse objects from different section of the screen into a smaller area. Screenshot 408 in FIG. 4 shows the resultant VU environment after the energy conservation schemes are applied. The three-dimensional buildings, people, and dog are presented as two-dimensional objects. The energy conservation agent 212 also reduces the resolution of the virtual objects (e.g., building, dog). Additionally, because the energy conservation agent 212 also offloads some of the computation from the server 208 to the client 204, there is a huge reduction in server resource usage and a minor increase in client resource usage. Blocks 404 and 406 shows the memory and CPU usage for the server and client respectively before the energy conservation agent 212 applies power saving techniques. Block 410 shows a drastic reduction in server resources, while block 412 shows a negligible increase in client resource usage, after the energy conservation agent 212 offloads some of the processing. The flow continues at block 314, after the energy conservation agent applies energy conservation schemes to the virtual universe.

At block 314, the energy conservation agent 212 provides VU rewards to users who enable energy saving mechanisms. Although some users may employ energy saving mechanisms without being rewarded, users may be more likely to employ energy saving techniques if the VU provides incentives or rewards. In some instances, the energy conservation agent 212 can convert real world power savings into equivalent VU incentives. For example, the energy conservation agent 212 can reward users by crediting, to their account, an equivalent amount of VU money, higher game scores, concert tickets, and other virtual goods (e.g., furniture for virtual home, etc.). VU rewards can also include additional avatar functions, access to special areas, club memberships, special privileges (e.g., avatar may receive a new virtual car a month before it goes on sale), etc. In some instances, the energy conservation agent 212 can determine the rewards associated with a specified energy conservation scheme, while in other instances, users may have the option of choosing how they want to be compensated. The amount of currency or the monetary equivalent of the reward items could be relative to the overall savings in power, or if a conservation option is not particularly attractive, it may have a disproportionately larger reward value attached to it to entice users. The flow continues a block 316.

At block 316, the energy conservation agent 212 determines whether it has received a request to modify the applied energy conservation technique. In one embodiment, a user with a pre-existing profile may modify the energy conservation settings "on the fly" without having to change the profile. For example, a user with a predefined "low resolution" setting may walk into a virtual museum and may want to view objects in high resolution but with a reduced field of view, without making permanent modifications to the profile The energy conservation agent 212 can allow users to modify their energy conservation settings dynamically without making permanent changes to their profiles in the user preference database 214. Alternatively, the energy conservation agent 212 can provide the user with an option to make these modifications permanent. If the energy conservation agent 212 determines that the users want to modify the applied energy saving technique, the flow continues at block 308. Otherwise, the flow ends without any modifications to the applied VU energy conservation scheme.

At block 306, in the case where a user profile is available, the energy conservation agent 212 retrieves the user's energy conservation preferences. The flow 300 moves to block 306 coming from block 304, if a user profile exists for a specified user. The energy conservation agent 212 can use the user's login information (e.g., username) and interface with the user profile repository 214 to locate the user's energy conservation preferences. The user's energy conservation preferences can include generalized conservation schemes (e.g., apply low resolution, do not reduce field of view, etc.) or a more detailed set of rules (e.g., do not apply low resolution in concert, movie, games; apply reduced field of view in bank, etc.). After the energy conservation agent 212 retrieves the user's energy conservation preferences, the flow continues at block 312.

Virtual Universe Efficiency Mechanisms

As mentioned earlier, systems are rarely efficient in generating, managing, updating, and displaying virtual universes. For example, avatar positions are constantly changing and the server manages these computations so that client machines can easily detect the avatar's positions and motion and render the appropriate graphics. The embodiments described below include efficiency mechanisms that can reduce the amount of computation and bandwidth required per user to generate a VU environment. In some embodiments, the efficiency mechanisms can also reduce the amount of data communicated from the server to the clients. In some instances, the efficiency mechanisms can also reduce the power required to render the VU environment on the client's computer.

Figure 5:
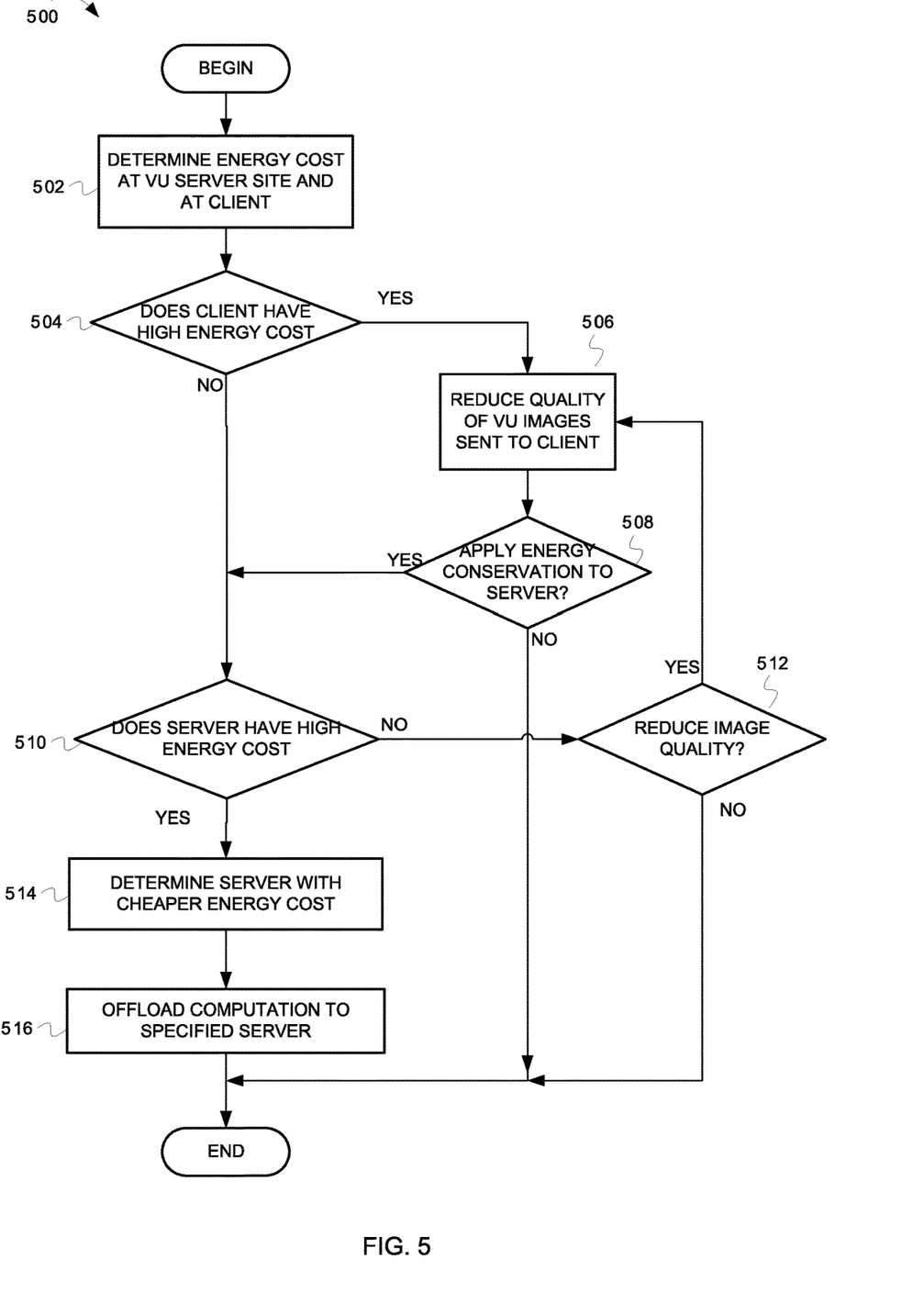
FIG. 5 is a flow diagram illustrating operations for determining and offloading computations to machines in areas with lower energy costs, according to some embodiments of the invention.

FIG. 5 is a flow diagram illustrating operations for determining and offloading computations to machines in areas with lower energy costs, according to some embodiments of the invention. The following discussion will describe the flow 500 with reference to the system of FIG. 2. The flow diagram 500 begins at block 502.

At block 502, the energy conservation agent 212 determines energy costs at a VU server site and at a client. In some instances, the energy conservation agent 212 can determine the machine location, the power company that services the area, and interface with the power company's website (or server) to determine energy costs at the client site and the VU server site. The flow continues at block 504.

At block 504, the energy conservation agent 212 determines whether the client has a high energy cost. The energy conservation agent 212 can compare the energy costs at the server and client locations to make this decision. In some instances, the energy conservation agent 212 can compute the average statewide, nationwide, or international energy cost. The energy conservation agent 212 can then compare the energy cost at the client site with the average energy cost and determine if the client has a high energy rate (e.g., 5 cents/kWh above national average). If the energy conservation agent 212 determines that energy costs are high at the client site, the flow continues at block 506. Otherwise, the flow continues at block 510.

At block 510, the energy conservation agent 212 determines whether the server has a high energy cost. As described earlier, the energy conservation agent 212 can compare the energy cost at the server's location with the energy costs at the client location, against the national average, or by other means. If the energy conservation agent 212 determines that energy costs are high at the server's site, the flow continues at block 514. Otherwise, the flow continues at block 512.

At block 514, the energy conservation agent 212 determines the server with the cheapest energy cost. The energy conservation agent 212 can determine the locations of all the VU servers. This information may be stored on each server, in the VU simulation agent, on a centralized server, etc. The energy conservation agent 212 can determine the energy costs at each of these locations and find the server with the cheapest energy cost. In some instances, the energy conservation agent 212 can also consider the load on each of these servers, the network bandwidth, the time and energy required to offload computations, and other such factors before making a decision. For example, if the server with the lowest energy cost is operating at full power and using its maximum resources, the energy conservation agent 212 can select another server, which is lightly loaded. As another example, if the server with the lowest energy cost can be accessed only via underwater fiber optic cables, the energy conservation agent 212 may choose to save on transmission costs and time by selecting an alternate nearby server. After the energy conservation agent 212 determines an appropriate alternate server with cheaper energy costs, the flow continues at block 516.

At block 516, the energy conservation agent 212 offloads computation to the server determined at block 514. In some instances, the energy conservation agent 212 can delegate some of the complex computation to the alternate server, thus reducing the load on the main server, and reducing energy costs at the server site. Once the load on the server is reduced, the voltage on the server can be dynamically scaled to take advantage of the reduced load. In other instances, the energy conservation agent 212 can transfer all the server's computational abilities to the alternate server and shut down the server's memory banks and/or the entire server. The flow ends after the energy conservation agent 212 offloads some or all of the VU processing to an alternate server.

At block 512, the energy conservation agent 212 determines whether the image quality should be reduced. The flow 500 moves to block 512 from block 510, when the energy conservation agent 212 determines that the server has a low energy cost. In some instances, if the server is heavily loaded, the energy conservation agent 212 may choose to reduce the quality of images (e.g., landscape) handled by the server to reduce the load on the server's resources. By reducing the rendering quality, the energy conservation agent 212 can reduce the amount of information managed and communicated by the server. If the energy conservation agent 212 determines that the image quality must be reduced, the flow continues at block 506. Otherwise, the flow ends without further modifications to the image quality.

At block 506, the energy conservation agent 212 directs the VU simulation agent 210 to reduce the quality of the VU images sent to the client. There are two situations in which the flow 500 moves to block 506: 1) coming from block 504, the energy conservation agent 212 may determine the energy costs are high at the client's site and reduce the quality of images sent to the client in an effort to reduce energy costs at the client; 2) coming from block 512, the energy conservation agent 212 may want to reduce the quality of images sent to the client, even though the server has a low energy cost, to reduce the computational load on the server. Reducing the quality of VU images can include reducing image resolution, presenting three-dimensional objects in their two-dimensional form, obfuscating distant objects, displaying static objects instead of dynamic ones (eliminating the need for update calculations), reducing special effects, etc. After the energy conservation agent 212 directs the VU simulation agent 210 to reduce the quality of the VU images, the flow continues at block 508.

At block 508, the energy conservation agent 212 determines whether to apply energy conservation to the server. In some embodiments, the energy conservation agent 212 can apply energy saving techniques to the server and the client. If the energy conservation agent 212 determines that energy conservation schemes have already been applied to the server or that they need not be applied to the server, the flow ends. Otherwise, the flow continues at block 510, where the energy conservation agent 212 can offload computation to a server with a lower energy cost or can reduce the quality of images sent to the client.

Figure 6:
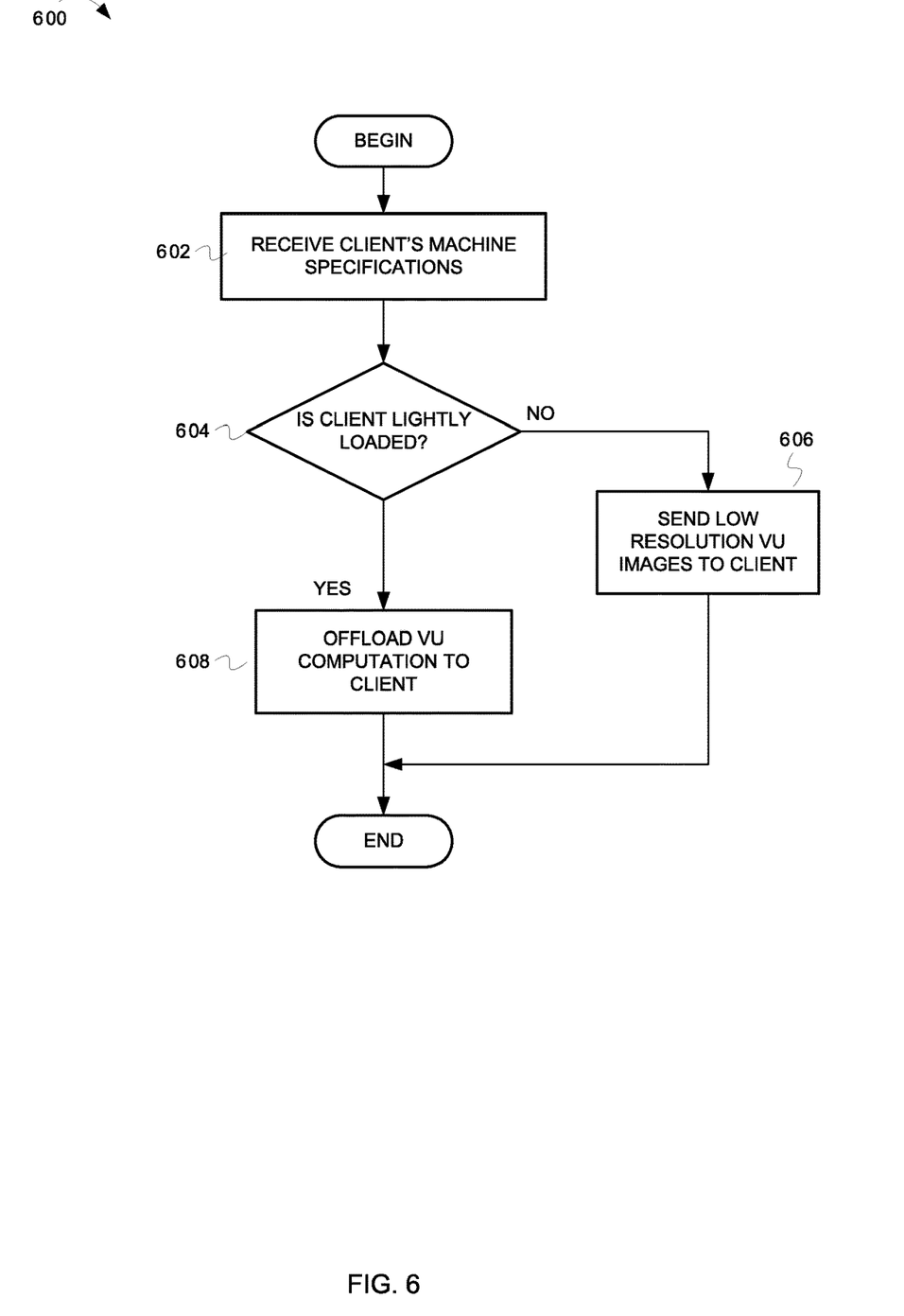
FIG. 6 is a flow diagram illustrating operations for reducing the computational load on the VU network, according to some embodiments of the invention.

FIG. 6 is a flow diagram illustrating operations for reducing the computational load on the VU network, according to some embodiments of the invention. The following discussion will describe the flow 600 with reference to the system of FIG. 2. The flow diagram 600 begins at block 602.

At block 602, the energy conservation agent 212 receives the client's machine specifications. In some instances, the energy conservation agent 212 can query the client 204 for its system specifications as soon as a user logs into a virtual universe. Machine specifications can include resource (e.g., CPU, memory) usage and client's graphics card configurations. Additionally, the energy conservation agent 212 can also query the client for number of applications being run simultaneously, nature of applications running on the client machine, amount of resources being used by each of the other applications, etc. to determine the current load on the client. The energy conservation agent 212 may also monitor Internet traffic to determine the amount of network bandwidth available. After the energy conservation 212 agent determines the client's system specifications, the flow continues at block 604.

At block 604, the energy conservation agent 212 determines whether the client is lightly loaded. In some instances, the energy conservation agent 212 can compare the client's resource usage against a pre-defined threshold to determine whether the client can share the server's processing load. For example, if the client's CPU usage is less than 40%, the energy conservation agent 212 may deem the client to be lightly loaded. If the energy conservation agent 212 determines that the client is using a small percentage of its total resources, the flow continues at block 608. Otherwise, the flow continues at block 606.

At block 606, the energy conservation agent 212 sends low resolution images to the client. If the client is operating with a heavy load, the energy conservation agent 212 can direct the VU simulation agent 210 to reduce the quality of VU images sent to the client 204. As described previously, reducing the quality of VU images can include reducing graphics resolution, presenting three-dimensional objects in their two-dimensional form, obfuscating distant objects, reducing special effects, etc. The energy conservation agent 212 can also direct the VU simulation agent 210 to send low resolution images at low refresh rates as opposed to making the client evaluate complex geometric data and perform complex graphical rendering calculations, especially when the machine does not have a complex graphics card and/or is heavily loaded. In reducing the quality of the VU images sent to the client, the energy conservation agent 212 can help reduce the load on the client and also conserve the server's energy and resources. Moreover, by reducing the amount of computation occurring on the client, techniques such as voltage scaling (i.e., operating components at a less than maximum voltage) can then be used to reduce the power consumed by each individual client machine, thus in aggregate achieving an overall energy and monetary savings. In some instances, energy conservation agent 212 can further reduce the client's load by serving low-resolution images at lengthening time intervals to the client, thus exempting the client from performing periodic geometric and lighting calculations. The long time intervals between updates may also reduce the potential load on the server, communication pipeline between server and client, and the client. The flow ends, after the energy conservation agent 212 directs the VU simulation agent 210 to send low quality images to the client.

At block 608, the energy conservation agent 212 offloads VU computation to the client. In some instances, the energy conservation agent 212 may direct the VU simulation agent 210 to off-load some aspects of computation and/or geometry monitoring and communication to the client machine depending on the nature of the client's graphics card and/or the load on the client. For example, currently, as an avatar traverses the landscape, the server must determine the appropriate geometries and textures that are relevant to the avatar's view of its surroundings and then send this information to the client. In some instances, the server may send a representation of the object to be displayed (e.g., a white building with dimensions 10 cm×5 cm×10 cm located at (10, 100, 50) in VU space) to the client. In another instance, to reduce the server load, the server can send the information once, along with a pointer to the VU object (e.g. "bank"). The client 204 can store this information in a cache. Thus, the next time the avatar traverses the bank, the server need not determine and manage the geometry. Although it would be efficacious if the structure of the bank did not change, if it did change, the server may or may not send the changed geometry because the latest version of the bank may not be needed.

Also, slightly increasing the client's computational load requirements may have only negligible impact on its power consumption, but this amount saved over many users could allow fewer high-powered servers to be used for VU management and generation, saving considerable power. In some instances, some server nodes may even be shut off. Referring to FIG. 4, blocks 404 and 406 depict the resource usage at the server and the client respectively, before computation offloading. As shown in the Figure, the server is operating at full capacity, while the client is using very little of its available memory and CPU power. After offloading some of the computation from the server to the clients, there is a drastic reduction in the server's resource usage and a negligible increase in the client's resource usage as illustrated by blocks 410 and 412. Referring back to FIG. 6, after the energy conservation agent 212 directs the VU simulation agent 210 to offload some of the VU computation to the client, the flow ends.

Managing Virtual Universe Incentives

Figure 7:
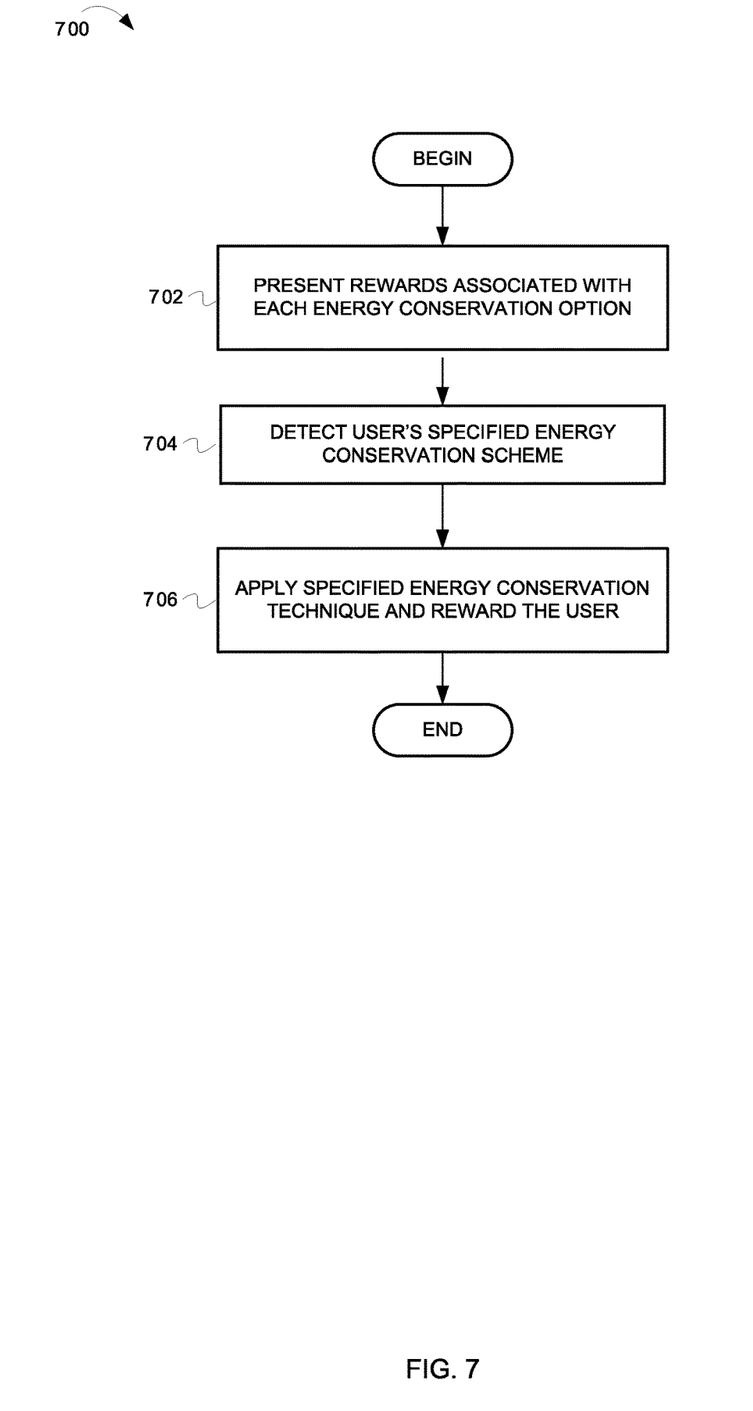
FIG. 7 is a flow diagram illustrating operations for determining and awarding energy conservation incentives in a virtual universe, according to some embodiments of the invention.

Some users are likely to employ power saving schemes (e.g., reducing resolution, reducing field of view, etc.) only if the VU provides incentives. For example, when a user voluntarily enables VU power saving schemes, the energy conservation agent can add, to the user's VU account, rewards commensurate with the amount of energy saved (in the real world) and the amount of time these techniques are in effect. FIG. 7 is a flow diagram illustrating operations for determining and awarding energy conservation incentives in a virtual universe, according to some embodiments of the invention. The following discussion will describe the flow 700 with reference to the system of FIG. 2. The flow 700 usually operates in conjunction with the flow 300 (FIG. 3). The flow diagram 700 begins at block 702.

At block 702, the energy conservation agent 212 presents rewards associated with each of the energy conservation options. In some embodiments, a VU incentive unit (not shown) may be triggered when an avatar implements an energy conservation mechanism, switches to a version of the VU that requires less energy, reduces the resolution or amount of detail (by means of a graphical control element such as switch, lever, slider, etc.), etc. In some instances, the energy conservation agent 212 can use any suitable algorithm to convert real world power savings into equivalent VU rewards. For example, when a user voluntarily enables VU energy saving options, an amount of VU money, game score points, additional capabilities in games, household items, concert tickets, avatar functions, exclusive memberships, etc. commensurate with the real world cost and/or energy savings can be added to the user's account. Also, users may often select an energy scheme based on the rewards. To entice users to select a particular energy saving scheme, it may have a disproportionately large value associated with it. After the energy conservation agent 212 presents, to the user, available energy saving schemes and the associated rewards, the flow continues at block 704.

At block 704, the energy conservation agent 212 detects the user's specified energy conservation technique. Users can select one or more energy conservation schemes by means of a graphical control element (e.g., switch, lever, slider, etc.) on the virtual landscape, a written or spoken command, via a drop down menu, an avatar gesture, or by other means. The energy conservation agent 212 can determine the user-specified technique by monitoring user operations, receiving communication from the client 204, receiving communications from the VU simulation agent 210, or by other means. The flow continues at block 706.

At block 706, the energy conservation agent 212 applies the specified energy conservation technique to the virtual universe environment and rewards the user for opting to conserve energy and system resources. Rewarding users serves as a means for enticing users to adopt power saving schemes and promoting certain energy conservation mechanisms. For example, to entice users to select the "two-dimensional graphics" option, the energy conservation agent 212 may associate with it, the equivalent amount of VU currency, a new virtual sports car, and a new set of avatar clothes in the latest designs. The energy conservation agent 212 can store the accrued rewards (e.g., VU currency, points, avatar functions, special privileges, etc.) in the user profile database 214 (or in a separate database on the server). In some instances, users may also have the option of selecting their reward or exchanging their reward for other objects, avatar functions, etc. After the energy conservation agent 212 compensates the user for enabling a power saving scheme, the flow ends.

Example Server Architecture

Figure 8:
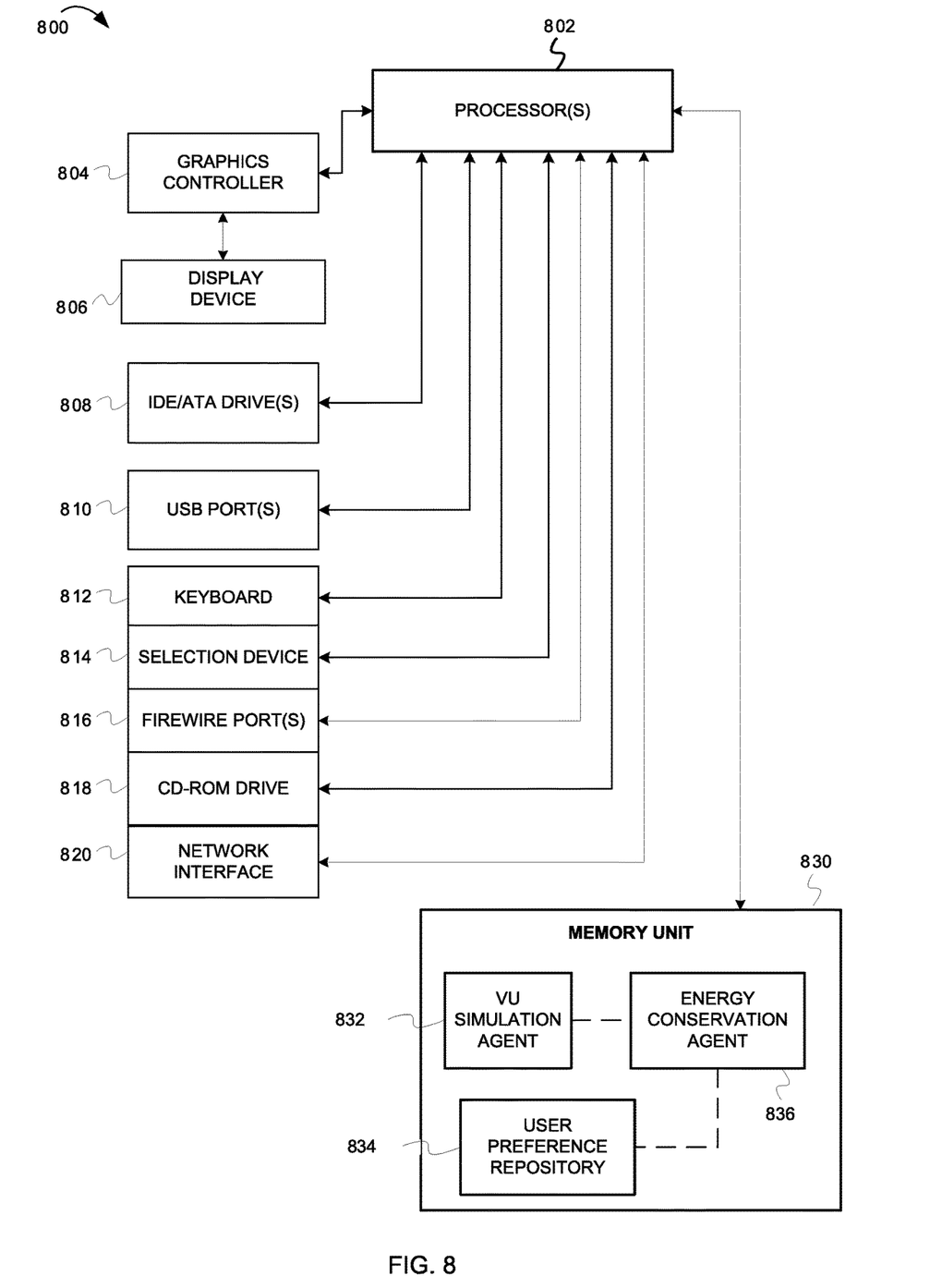
FIG. 8 is a block diagram illustrating a computer system configured to determine and apply energy conservation techniques in a virtual universe, according to some embodiments of the invention.

FIG. 8 is a block diagram illustrating a computer system configured to determine and apply energy conservation techniques in a virtual universe, according to some embodiments of the invention. The computer system 800 can be deployed as a server from FIG. 2.

The computer system 800 includes a processor 802. The processor 802 may be connected an input/output controller hub (ICH) also known as a south bridge. The processor 802 is also connected to other input/output devices such as IDE/ATA drives 808, universal serial bus (USB) ports 840, a keyboard 812, a selection device 814, firewire ports 816, a CD-ROM drive 818, and a network interface 820. The processor 802 can also be connected to a graphics controller 804, which connects to a display device 806 (e.g., monitor). A memory unit 830 interfaces with the processor 802 and can include any suitable random access memory (RAM), such as static RAM, dynamic RAM, synchronous dynamic RAM, extended data output RAM, etc.

In one embodiment, the memory unit 830 includes a virtual universe simulation agent 832, a user preference repository 834, and an energy conservation agent 836. The VU simulation agent 832 includes logic (e.g., software) to present a virtual universe environment including VU objects, graphics, and landscape, detect avatar motion, calculate avatar position, etc. The user preference repository 834 can include a list of registered VU users and user details such as avatar name, user status, permissions, energy conservation preferences, etc. The energy conservation agent 836 can include energy conservation schemes associated with VU geographic areas. The energy conservation agent 836 can enable the VU server and/or the clients to conserve energy, resources, costs (e.g., energy cost), network bandwidth, etc. and reduce computation according to the users' preferences.

In some embodiments, the computer system 800 can include additional devices and/or more than one of each component shown in FIG. 8 (e.g., video cards, audio cards, peripheral devices, etc.). For example, in some instances, the computer system 800 may include multiple processors, multiple cores, multiple external CPU's. In other instances, components may even be integrated or subdivided.

Any of the embodiments may include a computer program product, or software, that includes a machine-readable data storage medium having stored thereon instructions, which may be used to program a computer system (or other electronic devices) to perform a process according to embodiments, whether presently described or not, since every conceivable variation is not enumerated herein. A machine-readable data storage medium includes any mechanism for storing information in a form (e.g., software, processing application) readable by a machine (e.g., a computer). The machine-readable data storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of data storage medium suitable for storing electronic instructions.

CONCLUSION

While the embodiments are described with reference to various implementations and exploitations, it will be understood that these embodiments are illustrative and that the scope of the inventive subject matter is not limited to them. In general, techniques for introducing selective energy efficiency in a virtual environment are described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method for energy conservation comprising:
    selecting, by a server, an avatar of a virtual universe,
    offloading, by the server, at least some operations for processing the avatar to a machine residing at a second location at which a cost of power associated with processing the avatar in the virtual universe is less that a cost of power associated with processing the avatar in the virtual universe at a first location at which the server resides;
    determining, by the server, energy conservation options applicable to the avatar;
    reducing, by the server, based on the energy conservation options, image quality of the avatar to reduce power consumption by the server; and
    transmitting, by the server, the avatar with reduced image quality to a client over a communication network.

2. The method of claim 1, further comprising:
    determining, by the server, incentives associated with the available energy conservation options;
    applying, by the server, incentives associated with the selected energy conservation options to an account associated with the avatar.

3. The method of claim 2, wherein determining incentives comprises determining energy saving values associated with each of the available energy conservation options.

4. The method of claim 1, wherein the portions of the virtual universe comprises the avatar, and the selected energy conservation options comprises rendering the avatar at a reduced resolution.

5. The method of claim 1, wherein the portions of the virtual universe comprises a first one or more virtual universe objects, and the selected energy conservation options comprises rendering the first one or more virtual universe objects at a reduced resolution.

6. The method of claim 5, wherein the selected energy conservation options further comprises rendering a second one or more virtual universe objects at a higher resolution relative to the first one or more virtual universe objects.

7. The method of claim 1, wherein applying the selected energy conservation options comprises:
    determining, by the server, a client machine specifications;
    determining, by the server, a workload of the client machine; and
    determining, by the server, to offload virtual universe computations to the client machine in response to determining the workload is below a threshold.

8. A computer system comprising a memory and a processor coupled to the memory, the processor configured to:
    select, by a server, an avatar of a virtual universe,
    offload, by the server, at least some operations for processing the avatar to a machine residing at a second location at which a cost of power associated with processing the avatar in the virtual universe is less that a cost of power associated with processing the avatar in the virtual universe at a first location at which the server resides;
    determine, by the server, energy conservation options applicable to the avatar;
    reduce, by the server based on the energy conservation options, image quality of the avatar to reduce power consumption by the computer system; and
    transmit, by the server, the avatar with reduced image quality to a client over a communication network.

9. The server of claim 8, wherein the processor is further configured to:
    determine incentives associated with the available energy conservation options;
    apply incentives associated with the selected energy conservation options to an account associated with the avatar.

10. The server of claim 9, wherein the processor configured to determine incentives comprises the processor configured to determine energy saving values associated with each of the available energy conservation options.

11. The server of claim 8, wherein the portions of the virtual universe comprise the avatar, and the selected energy conservation options comprise rendering the avatar at a reduced resolution.

12. The server of claim 8, wherein the portions of the virtual universe comprise a first one or more virtual universe objects, and the selected energy conservation options comprise rendering the first one or more virtual universe objects at a reduced resolution.

13. The server of claim 12, wherein the selected energy conservation options further comprise rendering a second one or more virtual universe objects at a higher resolution relative to the first one or more virtual universe objects.

14. The server of claim 8, wherein the processor configured to apply the selected energy conservation options comprises the processor configured to:
    determine a client machine specifications;
    determine a workload of the client machine; and
    determine to offload virtual universe computations to the client machine in response to determining the workload is below a threshold.

15. A computer program product comprising a non-transitory computer readable storage medium having program instructions embodied therewith, the program instructions executable by a processor to cause the processor to:
    select, by a server, an avatar of a virtual universe,
    offload, by the server, at least some operations for processing the avatar to a machine residing at a second location at which a cost of power associated with processing the avatar in the virtual universe is less that a cost of power associated with processing the avatar in the virtual universe at a first location at which the server resides;
    determine by the server, energy conservation options applicable to the avatar;
    reduce, by the server based on the energy conservation options, image quality of the avatar to reduce power consumption by the computer system; and
    transmit, by the server, the avatar with reduced image quality to a client over a communication network.

16. The computer program product of claim 15, further comprising program instructions to cause the processor to:
- determine incentives associated with the available energy conservation options;
- apply incentives associated with the selected energy conservation options to an account associated with the avatar.

17. The computer program product of claim 16, wherein the program instructions executable by the processor to determine incentives comprises program instructions to cause the processor to determine energy saving values associated with each of the available energy conservation options.

18. The computer program product of claim 15, wherein the portions of the virtual universe comprise the avatar, and the selected energy conservation options comprise rendering the avatar at a reduced resolution.

19. The computer program product of claim 15, wherein the portions of the virtual universe comprise a first one or more virtual universe objects, and the selected energy conservation options comprise rendering the first one or more virtual universe objects at a reduced resolution and rendering a second one or more virtual universe objects at a higher resolution relative to the first one or more virtual universe objects.

20. The computer program product of claim 15, wherein the program instructions executable by the processor to apply the selected energy conservation options comprises program instructions to cause the processor to:
- determine a client machine specifications;
- determine a workload of the client machine; and
- determine to offload virtual universe computations to the client machine in response to determining the workload is below a threshold.

* * * * *